(12) United States Patent
You et al.

(10) Patent No.: US 9,114,571 B2
(45) Date of Patent: Aug. 25, 2015

(54) METHOD FOR REDUCING STRESS IN THREE DIMENSIONAL MODEL

(71) Applicant: SOLIDSCAPE, INC., Merrimack, NH (US)

(72) Inventors: Xiaorong You, Shrewsbury, MA (US); Jennifer Elizabeth Gingras, Epping, NH (US); Calvin McCoy Winey, Peterborough, NH (US); John T. Wigand, Nashua, NH (US)

(73) Assignee: Solidscape, Inc., Merrimack, NH (US)

( * ) Notice: Subject to any disclaimer, the term of this patent is extended or adjusted under 35 U.S.C. 154(b) by 484 days.

(21) Appl. No.: 13/661,287

(22) Filed: Oct. 26, 2012

(65) Prior Publication Data

US 2013/0119577 A1   May 16, 2013

Related U.S. Application Data

(60) Provisional application No. 61/552,133, filed on Oct. 27, 2011.

(51) Int. Cl.
| | |
|---|---|
| *B29C 33/52* | (2006.01) |
| *B29C 71/02* | (2006.01) |
| *B29C 67/00* | (2006.01) |
| *B29C 33/44* | (2006.01) |
| *B29C 37/00* | (2006.01) |

(52) U.S. Cl.
CPC ............... *B29C 71/02* (2013.01); *B29C 33/448* (2013.01); *B29C 67/0055* (2013.01); *B29C 67/0092* (2013.01); *B29C 37/0003* (2013.01)

(58) Field of Classification Search
CPC .. B29C 33/448; B29C 33/52; B29C 67/0051; B29C 67/0055

USPC .......................................... 264/221, 308, 317
See application file for complete search history.

(56) References Cited

U.S. PATENT DOCUMENTS

| | | | |
|---|---|---|---|
| 4,247,508 | A | 1/1981 | Housholder |
| 5,136,515 | A | 8/1992 | Helinski |
| 5,209,878 | A | 5/1993 | Smalley et al. |
| 5,260,009 | A | 11/1993 | Penn |
| 5,506,607 | A | 4/1996 | Sanders, Jr. et al. |
| 5,740,051 | A | 4/1998 | Sanders, Jr. et al. |

(Continued)

*Primary Examiner* — Leo B Tentoni
(74) *Attorney, Agent, or Firm* — Davis & Bujold, P.L.L.C.; Michael J. Bujold

(57) ABSTRACT

An apparatus and method of fabricating a three-dimensional model which reduces occurrence of one a hairline crack(s), stress fracture(s), break(s), flaw(s) and/or other imperfection(s) in the final three-dimensional model. The method comprising the steps of selecting the model material, selecting the sacrificial material, and adding at least one additive to the sacrificial material for at least one of increasing the thermal conductivity, decreasing a coefficient of thermal expansion or decreasing an ability of the sacrificial material to transmit stress to the model material. The three-dimensional composite model is built by depositing a plurality of layers one on top of another. Following completion of the three-dimensional composite model, using at least one of the increase in the thermal conductivity, the decrease in the coefficient of thermal expansion and the decrease in the ability of the composite sacrificial material to transmit stress to the model material for removing the composite sacrificial material from the model material without creating any hairline crack(s), stress fracture(s), break(s), flaw(s) and/or other imperfection(s) in the final three-dimensional model.

20 Claims, 2 Drawing Sheets

(56) References Cited

U.S. PATENT DOCUMENTS

| | | |
|---|---|---|
| 6,019,814 A | 2/2000 | Horine |
| 6,175,422 B1 | 1/2001 | Penn et al. |
| 7,003,864 B2 | 2/2006 | Dirscherl |
| 2002/0017743 A1* | 2/2002 | Priedeman, Jr. ............... 264/464 |
| 2002/0129485 A1 | 9/2002 | Mok et al. |
| 2004/0089980 A1 | 5/2004 | Owada |
| 2005/0087897 A1 | 4/2005 | Nielsen et al. |
| 2009/0252821 A1 | 10/2009 | Wigand et al. |
| 2010/0021638 A1 | 1/2010 | Varanka et al. |
| 2010/0140850 A1* | 6/2010 | Napadensky et al. ......... 264/401 |

* cited by examiner

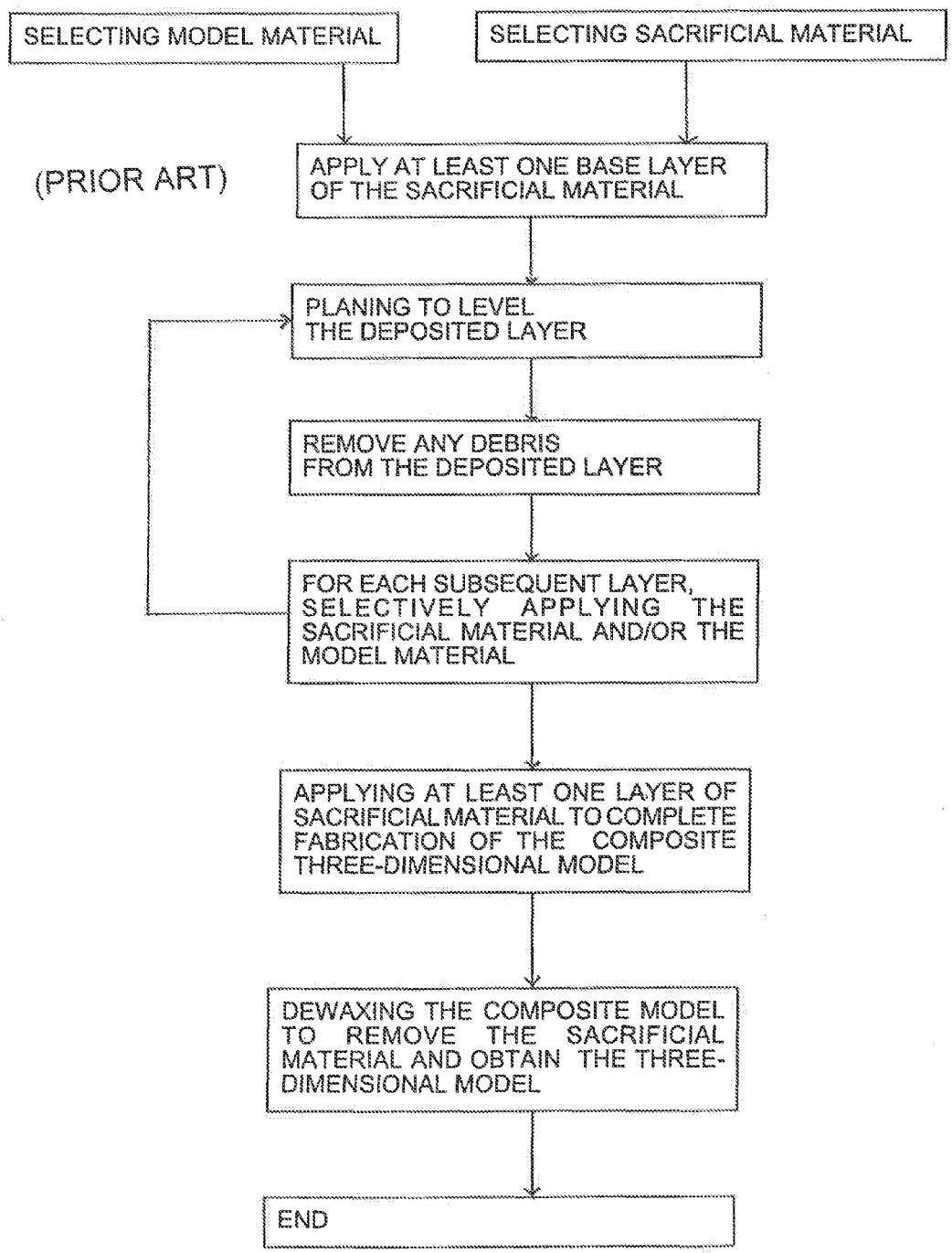

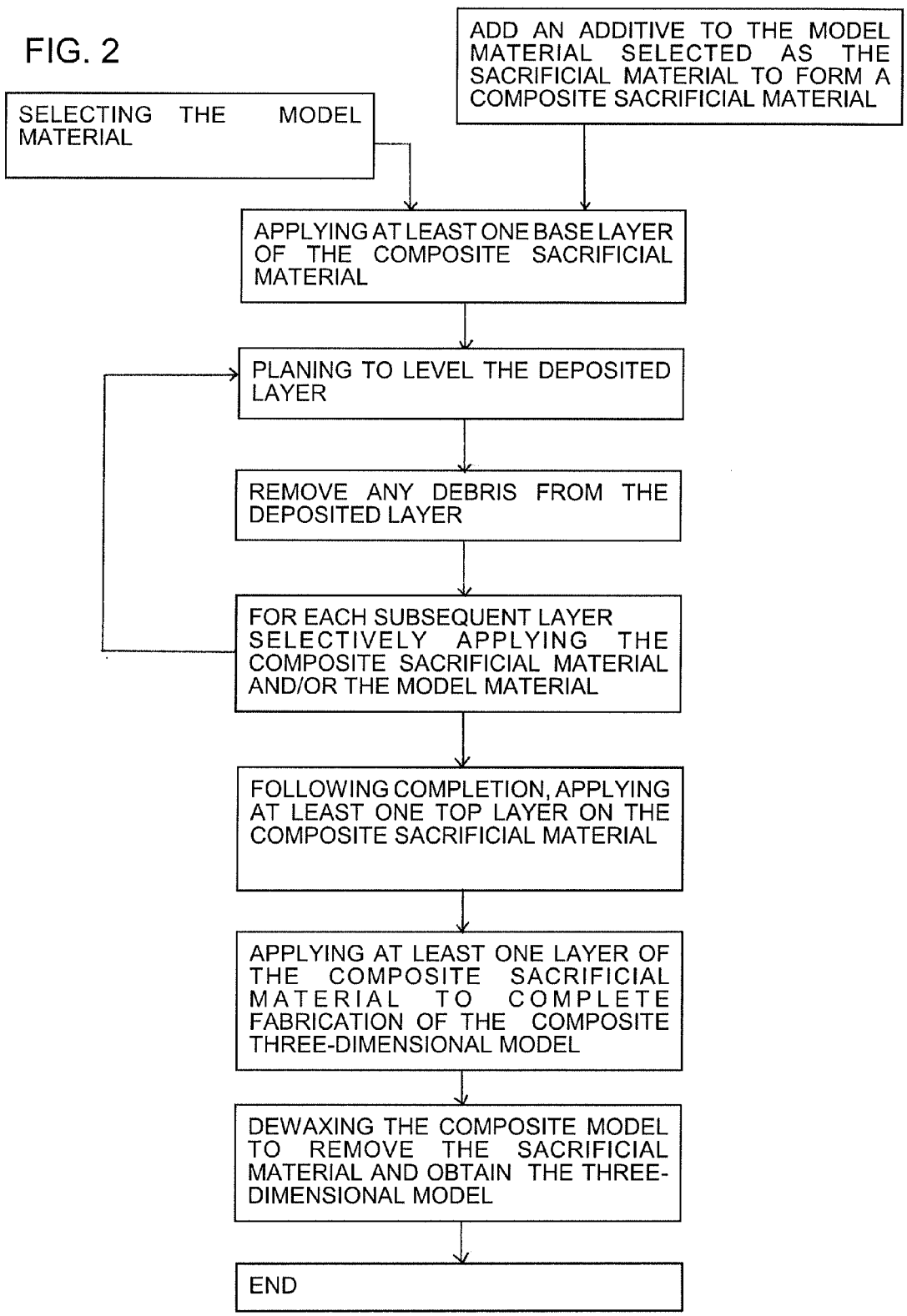

METHOD FOR REDUCING STRESS IN THREE DIMENSIONAL MODEL

FIELD OF THE INVENTION

The present invention relates to a method for and a technique for reducing stress fractures and cracks in a constructed three-dimensional model when using, during the dewaxing process, heat to separate the sacrificial material from the model material and thereby obtain the final three-dimensional model which is free of stress fractures, breaks and cracks.

BACKGROUND OF THE INVENTION

Various methods and systems for construction of three-dimensional models or objects have been developed for a number of applications, including the rapid fabrication of prototypes and the low volume fabrication of models and objects of varying degrees of complexity.

The need for rapid, low cost, low volume fabrication of models and parts has generally been met by various three-dimensional (3D) modeling processes that employ layer by layer building processes. According to typical 3D modeling processes of the prior art, a model or a part is built up by the successive deposition of layers generally comprising a "model" material, forming the final part to be manufactured, and a sacrificial material that provides support for the model material during the building process. Following completion of the fabrication process, the sacrificial material is subsequently removed thereby leaving the model material which forms the final part to be manufactured.

Typical examples of 3D modeling processes of the prior art include, for example, Householder, U.S. Pat. No. 4,247,508, which describes a modeling process that employs two substances, one a fill material and the other a mold material, that are deposited layer by layer to build an article. The two materials in each layer are not in contact with each other while the layer is being formed because Householder '508 uses a grid to separate the two materials as they are being deposited. After the materials in each layer are deposited, the grid is moved to the next layer so that the two materials may fill the space left by the removed grid and thereafter solidify in contact with each other in the same layer.

Helinski, U.S. Pat. No. 5,136,515, describes a method wherein a three-dimensional model is produced layer by layer by jetting droplets of at least two solidifiable materials, one material forming the article and a second material forming a support for the article. The second material is subsequently removed by heating, cutting, melting, chemical reacting, and so on, to leave the desired article.

Penn, U.S. Pat. No. 5,260,009, describes a system and process for making three-dimensional objects by dispensing layer upon layer of modeling material using an inkjet which is turned "on" or "off" according to a two dimensional data map of each layer of the object. The two dimensional data map is stored and relayed by a microprocessor and defines locations on a matrix at which printing is to occur in a manner such as is used in printing images using raster scan printing.

Sanders, Jr. et al., U.S. Pat. No. 5,506,607, describes a system for building three-dimensional models by vector plotting layer-upon-layer applications of solidifiable substances. The layers are formed by expelling minuscule beads of the substances in a liquid or flowable phase onto a platform from one or more jets wherein the jets and platform are relatively movable in the X, Y and Z coordinate system and the beads are deposited along vectors during X-Y relative movement.

Sanders, Jr. et al., U.S. Pat. No. 5,740,051, describes a method and apparatus for producing a three-dimensional model by forming a continuous plurality of parallel layers of modeling material by repeatedly producing a plurality of bead producing drops of the modeling material for deposition at desired locations, controlling the locations and timing of deposition to produce vectors in any and all directions required to produce an outer surface defining a wall of a layer with a desired surface finish, and adjusting the distance of the location of drop production to the location of drop deposition in preparation for the formation of a subsequent layer.

Penn et al., U.S. Pat. No. 6,175,422, describes a method and process for computer-controlled manufacture of three-dimensional objects by dispensing a layer of a first insoluble material, such as a liquid, onto a platform at predetermined locations corresponding to a cross-section of the object, which then hardens. A second material, preferably water soluble, is then sprayed onto this layer to thereby encapsulate the hardened insoluble material. The uppermost surface of this encapsulant is planed, thus removing a portion of the encapsulant to expose the underlying insoluble material for a new pattern deposition. After any resulting planing residue is removed, another layer of liquid, insoluble material is dispensed onto the planed surface. The insoluble material can be of any color and may vary from layer to layer, and from location within a layer to location with a layer. These steps are repeated, until the desired three-dimensional object, encapsulated in the soluble material, is completed. At this point, the object is either heated or immersed in solvent, thereby dissolving the soluble material and leaving the three-dimensional object intact.

Other systems and methods of the prior are described, for example, in U.S. Patent Publication No. 2009/0252821 which relates to a method of fabricating a model by deposition of a model material and a sacrificial material in layers wherein the sacrificial material which defines the bounds of the model is deposited drop by drop and the model material is deposited at high speed by spraying, while U.S. Patent Publication No. 2010/0021638 additionally describes the use of a third material to construct the layers and U.S. Pat. No. 6,019,814— relates to the use of a nozzleless, ultrasonic device for the sequential deposition of the materials.

U.S. Patent Publication No. 2005/087897 relates to a variation of the basic method for constructing a model by deposition of successive layers of a model material comprising the model and shell material enclosing the model material wherein certain layers may be deposited as partial layers to reduce the volume of material to removed when each layer is planed and to permit the construction of more complex geometries in the layers.

U.S. Pat. No. 5,209,878 relates to the use of either thin partial layers of material or a material capable forming a meniscus in the edge regions between successive layers of different dimensions to reduce or eliminate "stairstep" voids created at the edges of layers having different dimensions.

U.S. Patent Publication No. 2002/0129485 describes a system which is an agglomeration of previously known systems for fabricating three-dimensional objects which thereby provides a very flexible but complex system capable of achieving features of a wide variety of methods.

Other prior art systems employ methods somewhat analogous to those used to construct three-dimensional objects as successive layers of different materials, but are adapted specifically and essentially to object molding processes. For example, U.S. Patent Publication No. 2004/0089980 describes a method for fabricating three-dimensional models by deposition and machining of three or four successive thick layers, thereby concurrently forming a mold for the object and the object itself. The layers include including a first additive (non-sacrificial) layer which is machined to define the bottom contour of a next layer, which is a second additive (non-sacrificial) layer. The second additive (non-sacrificial) layer is deposited on the first subtractive (sacrificial) layer and machined to define the upper contour of the second additive (non-sacrificial) layer, which is the top of the finished model, with a second subtractive (sacrificial) layer being deposited and machined, if desired. The subtractive (sacrificial) material is removed when all layers are completed, thereby leaving a model formed of the additive (non-sacrificial) material.

U.S. Pat. No. 7,003,864 describes a method that is generally similar to that described in U.S. Patent Publication No. 2004/0089980 in depositing and machining three layers which concurrently form a mold for an object and the object itself, including depositing and planing a base layer of support material, depositing and removing regions of a second layer to form a mold of the part, adding a construction material to the removed regions of the second layer, and planing or machining the support and construction materials of the second layer.

Following manufacture of a three-dimensional composite model, comprising both the sacrificial material and the model material, it becomes necessary to separate and remove the sacrificial material from the model material to thereby obtain the desired three-dimensional model. During such removal process, the three-dimensional composite model is first removed from the manufacturing table or other support platform upon which the three-dimensional composite model was fabricated, and this is typically achieved by use of either heat (e.g., heating the surface of the manufacturing table or other support platform) or a conventional solvent. Next, the sacrificial material must be removed and separated from the model material to thereby obtain the desired three-dimensional model and such removal and separation is typically achieved by a dewaxing process, i.e., the process for removing the sacrificial material from the model material.

One currently utilized dewaxing process involves placing the fabricated three-dimensional composite model, following removal from the manufacturing table or other support platform, in a heated (VSO) bath, at a temperature of about 55° C., for approximately 45 minutes in order to dissolve and melt away the sacrificial material from the model material. As is known in the art, this conventional dewaxing process does not work very efficiently without increasing or elevating the temperature of the bath. As the temperature of the bath is elevated, the rate at which the sacrificial material dissolved away from the three-dimensional composite model is consequentially increased and this leads to a much faster and expedited separation of the sacrificial material from the model material and thereby the final three-dimensional model.

During such dewaxing process, the inventors found that some fragile models had hairline cracks and fractures as well as other breaks which detracted from the overall quality of the final three-dimensional model which typically leads to the unacceptability of the final three-dimensional model. The inventors have also noted that this problem is particularly problematic with three-dimensional models which have either one or more very thin wall(s) or thin section(s), one or more fine detail(s) or feature(s) or one or more intricate component(s) or element(s). In the event that the final three-dimensional model is deemed unacceptable, then the manufacturing process to obtain the unacceptable three-dimensional model must be refabricated and this, in turn, leads to lost manufacturing time and added expenses and is to be avoided.

As a result of closely examining the hairline crack(s), fracture(s), break(s), flaw(s) and/or other imperfection(s) that sometimes occur in three-dimensional models, the inventors believe that such flaws and imperfections are occurring as a result of one or more of the following factors. That is, the inventors believe that such flaws and imperfections occur because of either a higher coefficient of thermal expansion for the sacrificial material than for the model material, the differences in thermal conductivity between the sacrificial material and the model material and/or the propensity of the sacrificial material to carry or transmit stress throughout the composite model to the final three-dimensional model.

The current methods and systems of the prior art, for fabricating three-dimensional models and objects, however, each have a significant number of fundamental problems as briefly discussed above.

SUMMARY OF THE INVENTION

Wherefore, it is an object of the present invention to overcome the above mentioned shortcomings and drawbacks associated with the prior art.

The present invention provides a solution to many of the above as well as other related problems of the prior art thereby results in a three-dimensional model which is substantially free of any stress fractures, hairline cracks and/or breaks in the model material.

An object of the present invention is to mix or add at least one additive to one of the sacrificial material and/or the model material so that the sacrificial material and/or the model material is/are less prone to hairline crack(s), stress fracture(s), break(s), flaw(s) and/or other imperfection(s) when the sacrificial material is separated from the model material, and thereby result in the desired three-dimensional model which is free of hairline crack(s), stress fracture(s), break(s), flaw(s) and/or other imperfection(s).

A further object of the invention is to add at least one additive to the sacrificial material so that the additive improves at least one of: (1) the thermal conductivity of the sacrificial material and thereby facilitates better dispersion of the heat more effectively in and throughout the sacrificial material to allow the sacrificial material to melt or dissolve away at a more rapid rate and thereby minimize the sacrificial material's ability to create stress within the composite model, (2) decrease or reduce the coefficient of thermal expansion of the sacrificial material so as to reduce the overall thermal expansion of the composite model and thereby minimize the creation of any hairline crack(s), stress fracture(s), break(s), flaw(s) and/or other imperfection(s), and/or (3) function as a disrupting or absorbing agent, within the sacrificial material, and thereby create weaken sites or areas within the sacrificial material that reduced the ability of the sacrificial material to carry or transmit stress throughout the composite model and thereby resist and/or avoid the creation of any hairline crack(s), stress fracture(s), break(s), flaw(s) and/or other imperfection(s) in the final three-dimensional model.

Yet another object of the present invention is to ensure that the additive for the sacrificial material and/or the model material has a very small particle size so that the additive forms a colloidal suspension which is uniformly dispersed within and throughout the sacrificial material or the model material so that the entire sacrificial material has consistent and uniform heat transfer and thermal expansion characteristics and/or properties while the entire model material has consistent and uniform strength improving characteristics and/or properties which tends to resist and avoid hairline crack(s), stress fracture(s), break(s), flaw(s) and/or other imperfection(s) in the final three-dimensional model.

Still another object of the present invention is to select the at least one additive, for the sacrificial material and/or the model material, so that the particle size of the at least one additive is no greater than 500 nm (nanometers), and more preferably the particle size of the at least one additive is about 200 nm (nanometers) or less, and most preferably the particle size of the at least one additive is about 20 nm (nanometers). Such particle size thereby facilitates a uniform dispersion and suspension of the at least one additive within and throughout the sacrificial material and/or the model material and maintains the uniform dispersion and suspension for a very long period of time.

Yet another object of the present invention is to select the at least one additive so that the at least one additive has a density which is somewhat similar to the density of the sacrificial material and/or the model material and such similarity in density thereby facilitate and promotes a more uniform dispersion and suspension of the at least one additive within the sacrificial material and/or the model material and minimizes the likelihood that the at least one additive will eventually separate and settle from the sacrificial material and/or the model material.

A still further object of the present invention is to add the at least one additive to the sacrificial material and/or the model material so that the at least one additive comprises between 0.05% by weight to about 20% by weight of the sacrificial material and/or the model material.

Another object of the invention is to add at least one additive to the sacrificial material so that the coefficient of thermal expansion and/or the thermal conductivity of the sacrificial material approaches and become closer to the coefficient of thermal expansion and/or the thermal conductivity of the model material so that both the sacrificial material and the model material are able to expand and contract with one another at a similar rate and thereby reduce the likelihood or possibility of the sacrificial material carrying or transmitting stress throughout the composite model and thereby the composite three-dimensional model tends to resist and avoid hairline crack(s), stress fracture(s), break(s), flaw(s) and/or other imperfection(s) during the dewaxing process.

The present invention also relates to a method of fabricating a three-dimensional model which minimizes occurrence of any stress flaw within the three-dimensional model in which the three-dimensional model is formed from a sacrificial material and a model material, and the method comprising the steps of: selecting a desired model material; selecting a desired sacrificial material; adding at least one additive to the sacrificial material for at least one of: increasing a thermal conductivity of the sacrificial material, decreasing a coefficient of thermal expansion of the sacrificial material and decreasing an ability of the sacrificial material to transmit stress to the model material, to form a composite sacrificial material; building a three-dimensional composite model by depositing a plurality of layers, one on top of another, with each layer comprising selective deposition of at least one of the composite sacrificial material and the model material; and following completion of the three-dimensional composite model, separating the composite sacrificial material from the model material by a dewaxing process, and during the dewaxing process, using at least one of the increase in the thermal conductivity of the sacrificial material, the decrease in the coefficient of thermal expansion of the sacrificial material and the decrease the ability of the sacrificial material to transmit stress to the model material to remove the composite sacrificial material from the model material without creating any stress flaws in the three-dimensional model.

The terms "stress flaw" and "stress flaws", as use within this patent application and the appended claims, are intended to mean one or more hairline crack(s), stress fracture(s), break(s), flaw(s) and/or other imperfection(s) which may be formed or created within the final three-dimensional model during the dewaxing process.

BRIEF DESCRIPTION OF THE DRAWINGS

The invention will now be described, by way of example, with reference to the accompanying drawings in which:

FIG. 1 is a is a diagrammatic view showing a conventional manufacturing process for manufacturing a three-dimensional composite model; and FIG. 2 is a diagrammatic view showing the process for modifying or altering the properties or characteristics of the sacrificial material so that as to avoid the creation of any stress fractures, hairline cracks or breaks within the final three-dimensional model.

DETAILED DESCRIPTION OF THE INVENTION

As described in the following, the present invention is generally directed to a method and a system for fabricating three-dimensional models by construction of a composite three-dimensional model formed of successive layers of at least one model material, comprising the model, and successive layers of at least one sacrificial material, comprising a supportive shell around and for the model. As this process is conventional, for completeness only a brief discussion concerning the same will now be provided. This brief discussion will thereafter be followed by a detailed discussion concerning the inventive aspects of the present invention.

As generally shown in FIG. 1, the three-dimensional model making process generally comprises first applying at least one layer of the sacrificial material, more preferably a plurality of layers of the sacrificial material are initially sequentially deposited onto the support table or some other build platform and this layer or these layers facilitate removal of the composite three-dimensional model following fabrication thereof. After each layer of the sacrificial material is deposited, a small portion of the deposited support material is shaved off, removed or planed to an intended final thickness of the deposited layer, thereby providing a smooth, level surface for fabrication or construction of the subsequent, next layer of the composite three-dimensional model, in a conventional manner. In addition, following the shaving, removal or planing step, the top surface of the table or platform may be vacuumed to ensure that any and all dust, fine(s) and/or other debris or remove material(s) is adequately removed from the composite three-dimensional model before the subsequent, next layer is deposited. It is be appreciated that as the composite three-dimensional model is being manufactured, many intermediate layers of the composite three-dimensional model will comprise a layer having one or more sections of the model material and one or more sections of the sacrificial material. Again, after each layer is deposited, a small portion of the deposited sacrificial and model material(s) is shaved, removed or planed, to level off the top most surface of the composite three-dimensional model being fabricated, and this process is typically followed by a vacuum process before each subsequent layer is are applied.

This method is then repeated, layer by layer, numerous times with each layer being formed of the model material, the sacrificial material or both the sacrificial and the model materials, as required depending upon the details or features of the model to be fabricated in each layer. It is to be appreciated that either, or both, of the sacrificial material and the model material may be used to construct support layers for succeeding layers of the sacrificial or the model material.

Once manufacture of the composite three-dimensional model is completed, generally one or more top layers, typically only comprising the sacrificial material, are applied to a top most surface of the composite three-dimensional model. Again, after each layer is deposited, a small portion of the deposited sacrificial material is shaved, removed or planed, to level off the top most surface three-dimensional model, and this process is typically followed by a vacuum process before each subsequent layer is are applied.

Following completion of the composite three-dimensional model, the composite three-dimensional model is then removed from the table or other build platform, e.g., by heat the table or other build platform in a conventional manner, for example, to soften or partially melt the sacrificial material securing the composite three-dimensional model to the table or other build platform. Next, the composite three-dimensional model is then subjected to a conventional dewaxing process, i.e., a process by which the sacrificial material is removed from the model material. The dewaxing process typically involves heating a suitable dewaxing solution—depending upon the composition of the sacrificial material and the model material—to an elevated temperature which increases the speed at which the sacrificial material is melted, dissolved and/or otherwise removed from the model material to thereby result in the final three-dimensional model.

With reference to FIG. 2, the inventors found that, especially with fragile models or models having fine or intricate details or features, for example, one or more hairline crack(s), stress fracture(s), break(s), flaw(s) and/or other imperfection(s) can occur in the final three-dimensional model, during this dewaxing process. Such hairline crack(s), stress fracture(s), break(s), flaw(s) and/or other imperfection(s) in the final three-dimensional model detracted from the overall quality of the final three-dimensional model as well as its acceptability for use as a template for replication of a desired item or object. This is especially important when the final three-dimensional model is used as a master pattern for investment casting production of a plurality of quality components.

For example, when the sacrificial material is melted or dissolved away from the model material in a heated VSO bath, e.g., at a temperature of about 40° C. for example, for approximately 45 minutes, it is noted that the sacrificial material does not readily dissolve away. In order to improve the melting or dissolving rate of the sacrificial material, the temperature of the bath is typically elevated to a temperature of about 55° C., or possibly greater. The inventors noted that as the temperature of the bath is elevated, although such temperature increase thereby increases the melting and/or dissolving rate of the sacrificial material, since the sacrificial material typically has a higher coefficient of thermal expansion than the model material, this increase in temperature also has a tendency of causing the sacrificial material to expand more rapidly, due to its higher coefficient of thermal expansion, than the model material. Such greater rate of expansion of the sacrificial material is believed to be one of the underlying causes of the hairline crack(s), stress fracture(s), break(s), flaw(s) and/or other imperfection(s) being in the final three-dimensional model.

In order to improve the characteristics and properties of the sacrificial material, e.g., increase the thermal conductivity of the sacrificial material, decrease the thermal expansion characteristics or properties of the sacrificial material and/or provide for the formation of weakening or stress absorbing sites within and throughout the sacrificial material, an additive is added to the sacrificial material before it is dispensed and deposited, in a conventional manner, for building the desired three-dimensional model. Preferably, the additive is a very fine powder or a particulate matter or composition and may comprise, for example, aluminum oxide ($Al_2O_3$), any ceramic powder, a silica powder, a diamond powder or an aluminum powder as well a variety of other nano powders or other similar compounds. The typically properties of aluminum oxide ($Al_2O_3$) are as follows:

Density—3.69-3.89 gm/cc (230.4-242.8 lb/ft3);

Thermal Conductivity—18-35 W/m·° K. (125-243 BTU·in/ft2·hr·° F.);

Coefficient of Thermal Expansion—8.1-8.4 $10^{-6}$/° C. (4.5-4.7 $10^{-6}$/° F.);

Specific Heat—880 J/Kg·° K. (0.21 Btu/lb·° F.).

The inventors have worked with Nanophase Technologies Corporation, of Romeoville, Ill., and that company now provides a source of a suitable sacrificial material having at least one additive added thereto which may be used in the practice of the present invention. This sacrificial material has approximately 3% by weight of aluminum oxide ($Al_2O_3$) added to the conventional sacrificial material and at least one additive, e.g., aluminum oxide ($Al_2O_3$), is uniformly dispersed within and throughout the sacrificial material and the at least one additive has a particle size of about 20 nm. The inventors have found that the at least one additive of this product, namely, aluminum oxide ($Al_2O_3$), is useful in altering one or more of the physical characteristics or properties of the sacrificial material, e.g., increasing the thermal conductivity of the sacrificial material, reducing the thermal expansion of the sacrificial material, and/or functioning as a disrupting agent thereby creating weakening sites or areas within the sacrificial material which reduce or decrease the ability of the sacrificial material to transfer stresses to the model material where such stresses may induce hairline crack(s), stress fracture(s), break(s), flaw(s) and/or other imperfection(s) in the final three-dimensional model.

Since the at least one additive will be dispensed from a conventional jetting orifice of a conventional dispensing head which typically has an orifice size of 75μ, and in view of the fact that at least one upstream filter is normally provided along the supply flow path of the sacrificial material to filter out any excessively large particles and prevent clogging of the jetting orifice of the dispensing head, preferably the at least one additive has a particle size that is less than 500 nm, and more preferably the at least one additive has a particle size that is 20 nm or less.

Moreover, due to the small particle size, the at least one additive is able to be readily suspended and remain suspended within and throughout the sacrificial material for prolonged periods of time without settling out of or becoming separated from the sacrificial material even while the sacrificial material is contained within an associated dispensing reservoir which is connected to the dispensing head and awaiting dispensing for fabrication of the desired three-dimensional model or while the three-dimensional model maker apparatus is sitting idle awaiting another build project, e.g., overnight, during a temporary production shut down, etc.

Preferably the density of the at least one additive has a density which is somewhat similar to the density of the sacrificial material. That is, preferably the density of the at least one additive is ±10% of the density of the sacrificial material, and more preferably the density of the at least one additive is ±5% of the density of the sacrificial material. The similar density between the at least one additive and the sacrificial material facilitates the formation of a consistent and uniform suspension or emulsion of the at least one additive within the sacrificial material and also significantly reduces the possibility that the at least one additive will eventually settle out of suspension with the sacrificial material.

Preferably the coefficient of thermal expansion of the at least one additive is less than the coefficient of thermal expansion of the sacrificial material. That is, preferably the coefficient of thermal expansion of the at least one additive is at least 10% less than the coefficient of thermal expansion of the sacrificial material, more preferably the coefficient of thermal expansion of the at least one additive is at least 20% less than the coefficient of thermal expansion of the sacrificial material, and most preferably the coefficient of thermal expansion of the at least one additive is at least 50% less than the coefficient of thermal expansion of the sacrificial material. Such lower coefficient of thermal expansion of the at least one additive thereby results in, when the at least one additive is mixed with the sacrificial material, a composite sacrificial material which has a lower composite coefficient of thermal expansion. Such lower composite coefficient of thermal expansion thus decreases the rate at which the sacrificial material combination expands, when heat to dissolve and melt away the composite sacrificial material from a remainder of the composite three-dimensional model and thereby significantly reduces the possibility that the difference in the coefficient of thermal expansion of the composite sacrificial material and the model material will result in the creation or formation of any hairline crack(s), stress fracture(s), break(s), flaw(s) and/or other imperfection(s) in the final three-dimensional model.

Preferably the thermal conductivity of the at least one additive is greater than the thermal conductivity of the sacrificial material. That is, preferably the thermal conductivity of the at least one additive is at least 10% greater than the thermal conductivity of the sacrificial material, more preferably the thermal conductivity of the at least one additive is at least 20% greater than the thermal conductivity of the sacrificial material, and most preferably the thermal conductivity of the at least one additive is at least 50% greater than the thermal conductivity of the sacrificial material. Such increased thermal conductivity of the at least one additive and the composite sacrificial material thus increases the rate at which the composite sacrificial material dissolves and melts away from a remainder of the composite three-dimensional model and thereby significantly reduces the possibility that the difference in thermal conductivity of the sacrificial and the model materials will result in the creation or formation of any hairline crack(s), stress fracture(s), break(s), flaw(s) and/or other imperfection(s) in the final three-dimensional model.

It is to be appreciated that a variety of other additives, such as oxides and/or powders, may also be used in place of the additives discussed above. Preferably the at least one additive is relatively inexpensive, has relatively good thermal conductivity properties and can be uniformly dispersed within and throughout the sacrificial material and/or the model material.

Moreover, it is to be appreciated that by varying the concentration of the at least one additive (e.g., by weight or by volume), the overall properties and/or characteristics of the composite sacrificial material and/or the composite model material can be varied to improve a particular property and/or characteristic of the composite sacrificial material and/or the composite model material, without departing from the spirit and scope of the present invention.

The at least one additive must be sufficiently small enough to readily pass through any filter(s), orifice(s), etc., located along the supply line of the sacrificial material and/or the model material while not being too large so that the at least one additive is prevented from readily forming a colloidal suspension of the at least one additive within the sacrificial material and/or the model material.

The sacrificial material may comprise, for example, a one or more of micro crystalline waxes, natural waxes and/or hardeners while the model material may comprise, for example, one or more of sulfonamides, plasticizers and/or softening agents.

Since certain changes may be made in the above described method and process of reducing formation of any hairline crack(s), stress fracture(s), break(s), flaw(s) and/or other imperfection(s) in the final three-dimensional model without departing from the spirit and scope of the invention herein involved, it is intended that all of the subject matter of the above description or shown in the accompanying drawings shall be interpreted merely as examples illustrating the inventive concept herein and shall not be construed as limiting the invention.

Wherefore, we claim:

1. A method of fabricating a three-dimensional model which minimizes occurrence of any stress flaw within the three-dimensional model in which the three-dimensional model is formed from a sacrificial material and a model material, and the method comprising the steps of:
   selecting a desired model material;
   selecting a desired sacrificial material having a first density;
   selecting at least one additive having a second density, the second density of the at least one additive being ±10% of the first density of the sacrificial material;
   adding the at least one additive to the sacrificial material for at least one of: increasing a thermal conductivity of the sacrificial material, decreasing a coefficient of thermal expansion of the sacrificial material and decreasing an ability of the sacrificial material to transmit stress to the model material;
   forming a uniform composite sacrificial material by dispersing the at least one additive within the sacrificial material uniformly, and suspending the at least one additive within the sacrificial material and minimizing a likelihood that the at least one additive will separate and settle from the sacrificial material;
   building a three-dimensional composite model by depositing a plurality of layers, one on top of another, with each layer comprising selective deposition of at least one of the composite sacrificial material and the model material; and
   following completion of the three-dimensional composite model, separating the composite sacrificial material from the model material by a dewaxing process, and during the dewaxing process, using at least one of the increase in the thermal conductivity of the sacrificial material, the decrease in the coefficient of thermal expansion of the sacrificial material and the decrease the ability of the sacrificial material to transmit stress to the model material to remove the composite sacrificial material from the model material without creating any stress flaws in the three-dimensional model.

2. The method of fabricating a three-dimensional model according to claim 1, further comprising the step of selecting the at least one additive to have a particle size of about 500 nm or less.

3. The method of fabricating a three-dimensional model according to claim 1, further comprising the step of selecting the at least one additive to have a particle size of about 20 nm or less.

4. The method of fabricating a three-dimensional model according to claim 2, further comprising the step of using aluminum oxide ($Al_2O_3$) as the at least one additive.

5. The method of fabricating a three-dimensional model according to claim 4, further comprising the step of adding approximately 3% by weight of the aluminum oxide ($Al_2O_3$) to the sacrificial material and uniformly dispersing the aluminum oxide ($Al_2O_3$) within and throughout the sacrificial material to form the composite sacrificial material.

6. The method of fabricating a three-dimensional model according to claim 1, further comprising the step of selecting the at least one additive to have a density which is ±5% of the density of the sacrificial material so that the similar densities of the at least one additive and the sacrificial material facilitate formation of a uniform emulsion of the at least one additive with the sacrificial material and formation the uniform composite sacrificial material.

7. The method of fabricating a three-dimensional model according to claim 1, further comprising the step of selecting the at least one additive to have a coefficient of thermal expansion that is at least 10% less than a coefficient of thermal expansion of the sacrificial material so that the decrease in the coefficient of thermal expansion of the at least one additive thus decreases a rate at which the composite sacrificial material expands, when heated, and thus minimizes creation of any stress flaws in the model material.

8. The method of fabricating a three-dimensional model according to claim 1, further comprising the step of selecting the at least one additive to have a thermal conductivity that is at least 10% greater than a thermal conductivity of the sacrificial material so that the increase in the thermal conductivity of the at least one additive thus increases a rate at which the composite sacrificial material dissolves, when heated, and thus minimizes creation of any stress flaws in the model material.

9. The method of fabricating a three-dimensional model according to claim 1, further comprising the step of melting the three-dimensional composite model in a heated VSO bath, at a temperature from about 40° C. to about 55° C. for about 45 minutes.

10. A method of fabricating a three-dimensional model comprising the steps of:
   selecting a desired model material;
   selecting a desired sacrificial material with a first density;
   selecting an at least one additive having a second density which is ±10% of the first density of the sacrificial material;
   forming a uniform composite sacrificial material and minimizing a likelihood that the at least one additive will separate and settle from the sacrificial material by dispersing the at least one additive within the sacrificial material uniformly and suspending the at least one additive within the sacrificial material;
   building a three-dimensional composite model by depositing a plurality of layers, one on top of another, with each layer comprising selective deposition of at least one of the composite sacrificial material and the model material; and
   following completion of the three-dimensional composite model, separating the composite sacrificial material from the model material to fabricate the three-dimensional model.

11. The method of fabricating a three-dimensional model according to claim 10, further comprising the step of selecting the at least one additive to have a particle size of about 500 nm or less.

12. The method of fabricating a three-dimensional model according to claim 10, further comprising the step of increasing a thermal conductivity of the sacrificial material by selecting the at least one additive to have a coefficient of thermal expansion that is at least 10% less than a coefficient of thermal expansion of the sacrificial material so that the decrease in the coefficient of thermal expansion of the at least one additive thus decreases a rate at which the composite sacrificial material expands when heated.

13. The method of fabricating a three-dimensional model according to claim 10, further comprising the step of selecting the at least one additive to have a particle size of about 20 nm or less.

14. The method of fabricating a three-dimensional model according to claim 10, further comprising the step of using aluminum oxide ($Al_2O_3$) as the at least one additive.

15. The method of fabricating a three-dimensional model according to claim 10, further comprising the step of adding approximately 3% by weight of aluminum oxide ($Al_2O_3$) to the sacrificial material and uniformly dispersing the aluminum oxide ($Al_2O_3$) within and throughout the sacrificial material to form the composite sacrificial material.

16. A method of fabricating a three-dimensional model comprising the steps of:
   selecting a desired model material;
   selecting a desired sacrificial material with a first density;
   selecting an at least one additive having: (a) a second density which is ±5% of the first density of the sacrificial material, (b) a particle size of about 500 nm or less, and (c) a coefficient of thermal expansion that is at least 10% less than a coefficient of thermal expansion of the sacrificial material so that a decrease in the coefficient of thermal expansion of the at least one additive thus decreases a rate at which the composite sacrificial material expands when heated;
   forming a uniform composite sacrificial material and minimizing a likelihood that the at least one additive will separate and settle from the sacrificial material by dispersing the at least one additive within the sacrificial material uniformly and suspending the at least one additive within the sacrificial material;
   building a three-dimensional composite model by depositing a plurality of layers, one on top of another, with each layer comprising selective deposition of at least one of the composite sacrificial material and the model material; and
   following completion of the three-dimensional composite model, separating the composite sacrificial material from the model material to fabricate the three-dimensional model.

17. The method of fabricating a three-dimensional model according to claim 16, further comprising the step of using aluminum oxide ($Al_2O_3$) as the at least one additive.

18. The method of fabricating a three-dimensional model according to claim 17, further comprising the step of selecting the at least one additive to have a particle size of about 20 nm or less.

19. The method of fabricating a three-dimensional model according to claim 18, further comprising the step of adding approximately 3% by weight of aluminum oxide ($Al_2O_3$) to the sacrificial material and uniformly dispersing the aluminum oxide ($Al_2O_3$) within and throughout the sacrificial material to form the composite sacrificial material.

20. The method of fabricating a three-dimensional model according to claim 16, further comprising the step of adding approximately 3% by weight of aluminum oxide ($Al_2O_3$) to the sacrificial material and uniformly dispersing the aluminum oxide ($Al_2O_3$) within and throughout the sacrificial material to form the composite sacrificial material.

* * * * *